United States Patent [19]

Tucker

[11] 3,732,396
[45] May 8, 1973

[54] STEAM VESSEL FOOD WARMER

[76] Inventor: Jacob S. Tucker, 4421 Granada Boulevard, Apt. 322, Warrensville Heights, Ohio 44122

[22] Filed: Sept. 13, 1971

[21] Appl. No.: 179,704

[52] U.S. Cl. .....................219/401, 99/324, 126/20, 126/369, 219/431, 219/525
[51] Int. Cl. .............................................F27d 11/02
[58] Field of Search......................219/401, 431, 440, 219/524, 525; 99/234; 126/20, 369

[56] References Cited

UNITED STATES PATENTS

| | | | |
|---|---|---|---|
| 2,674,935 | 4/1954 | Lewis et al. | 99/234 |
| 2,636,969 | 4/1953 | Lewis | 219/401 |
| 3,604,895 | 9/1971 | MacKay | 219/401 |
| 2,719,211 | 9/1955 | Lewis et al | 219/401 X |
| 2,980,099 | 4/1961 | Klemm | 126/20 |
| 3,500,818 | 3/1970 | Elias | 126/369 |

Primary Examiner—Volodymyr Y. Mayewsky
Attorney—Roy F. Hollander

[57] ABSTRACT

Steam heating apparatus for heating frozen and refrigerated foods to render them appetizing both in appearance and taste. Long and short steam heating periods are provided as well as a sear heater for browning meat, bread and the like. A short or long period of steam heating operation is initiated by depressing an appropriate switch associated with a timer which in turn controls a time delay relay. The second time delay relay controls operation of a motor driven pump which pumps water during a given interval to atomizing nozzles. The atomizing nozzles are mounted on a lower heating plate in a steam housing and direct atomized water droplets to an upper heated plate provided with apertures. The water droplets are converted into steam by contact with one or both of the hot plates. Steam rises through the apertures in the top plate to heat the food positioned thereon. Sear heating is controlled by a sear timer and is independent of the steam heating cycles.

8 Claims, 6 Drawing Figures

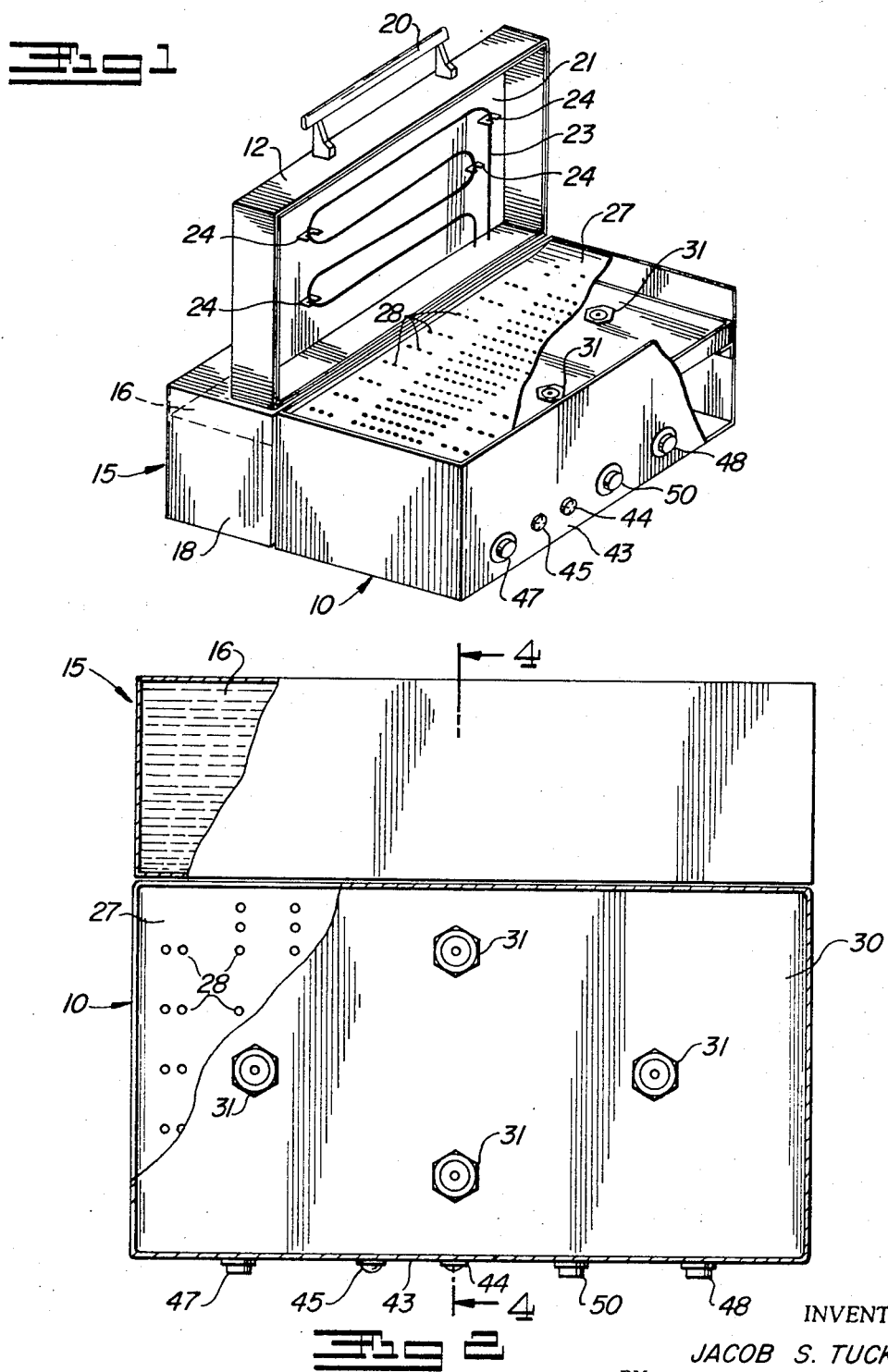

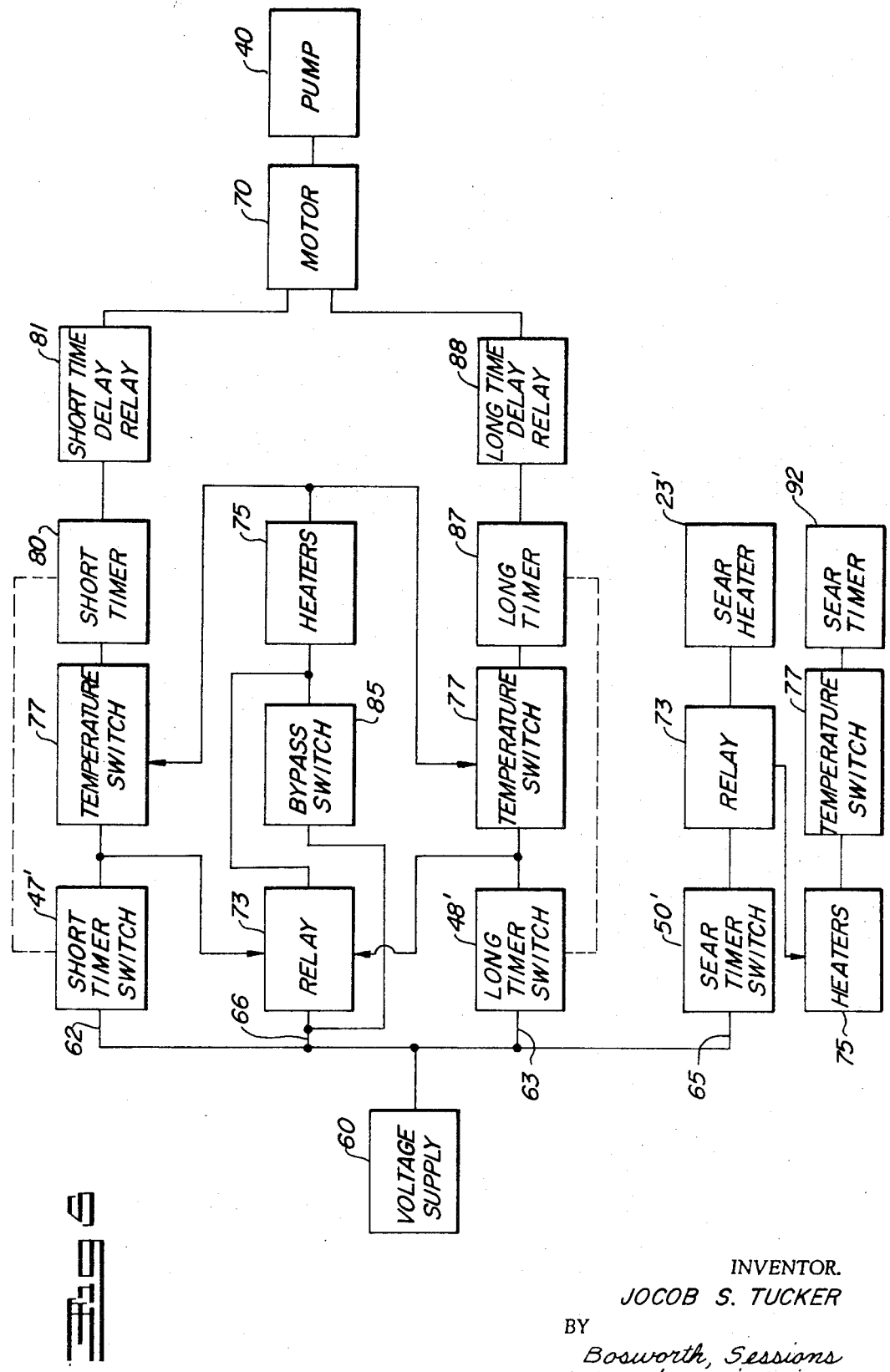

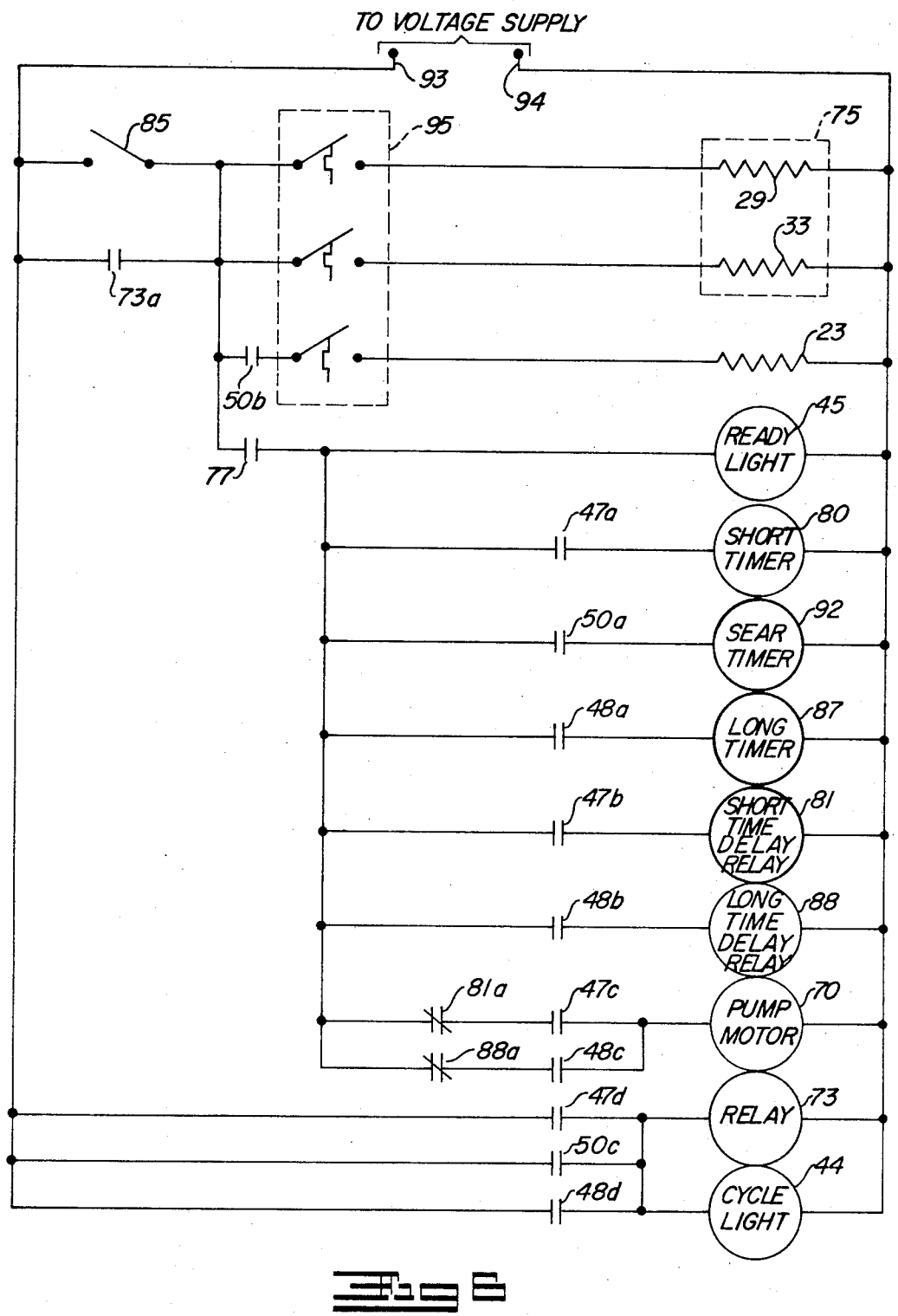

STEAM VESSEL FOOD WARMER

BACKGROUND OF THE INVENTION

This invention relates to devices for the steam heating of foods, such as those that have been precooked and frozen.

Devices of the type disclosed in this application are utilized for the quick heating of foods by treating the foods with steam in a closed chamber. The steam is generated within the chamber or adjacent thereto, and in prior systems is typically generated by heating water in elongated tubes by means of a gas burner to a temperature sufficient to transform the water into steam.

A growing use for such devices is in the heating of refrigerated foods and precooked, frozen foods such as T.V. dinners, frozen sandwiches and the like to a temperature suitable for consumption. More precisely, the frozen foods must not only be heated to a suitable temperature but also the natural appetizing appearance and flavor of the food must be restored. Since the foods tend to lose much of their natural juices and moisture when frozen or refrigerated, these too must be restored in the process of heating the food. Steam heating provides a natural advantage in restoring moisture to foods and this restoration of moisture also assists in restoring the natural appetizing appearance and taste of the food.

A problem with prior steam cooking apparatus, however, has been in the production of excessive moisture which renders the food soggy and unappetizing both in appearance and taste.

Another requirement in the steam heating of foods, particularly refrigerated and frozen foods, is minimization of the time required to heat the foods to the desired condition. The heating and serving of frozen or refrigerated sandwiches and dinners is a volume operation requiring that the food to be served be transformed from its frozen condition to one in which it has both the appearance and flavor of freshly cooked food. Consequently, emphasis is placed upon equipment methods which permit the heating to be done quickly while at the same time producing heated food that is pleasing in both appearance and taste.

SUMMARY OF THE INVENTION

A general object of this invention is to provide apparatus for steam heating foods that solves the problems noted above encountered in the use of prior such apparatus.

A more particular object is the provision of such a steam heating apparatus in which the production of steam is controlled so as to be sufficient but not excessive for the food being heated.

Another object of this invention is the provision of such steam heating apparatus in which frozen food can be transformed quickly from its frozen condition to a piping hot condition pleasing in both appearance and taste.

Still another object is the provision of such a steam heating apparatus that is quick and versatile in operation, having provision for heating either refrigerated but unfrozen sandwiches and the like or frozen dinners in the minimum time required for either to attain its natural pleasing condition in both appearance and taste.

These and other objects of the invention are achieved by the provision of apparatus for steam heating food including a steam housing, an apertured plate in the housing and a second plate in the housing below the apertured plate and defining therewith a steam producing compartment. A cover is connected to the housing to define a steam heating chamber between the cover and the apertured plate. Means are provided for heating the apertured plate. The second plate supports a plurality of atomizing nozzles. The nozzles are supplied with water from a supply thereof by a pump having an inlet connected to the water supply and an outlet connected to the atomizing nozzles. Means is provided for energizing the heating means and a timing means is responsive to a predetermined temperature of the heating means and causes the pump to supply water to the atomizing nozzles for a predetermined time period.

Another aspect of the invention includes the provision of a second timing means independent from the first and also responsive to a predetermined temperature of the heating means. The second timing means also causes the pump to supply water to the atomizing nozzles but for a different predetermined time period so that foods requiring significantly different steam heating periods may be heated.

In another aspect of the invention a bypass switch is provided to maintain the heating means continuously energized during periods of heavy use of the apparatus. This eliminates the waiting period for the heating means to elevate the apertured plate to the predetermined temperature.

In yet another aspect of the invention a sear heater is provided having its own timing means and operating independently of the pump so that such things as meat and bread can be browned if desire.

BRIEF DESCRIPTION OF THE DRAWINGS

FIG. 1 is a perspective view of steam heating apparatus embodying the present invention.

FIG. 2 is a plan view of the steam heating apparatus with portions broken away to show the water compartment and the atomizing nozzles supported on the lower plate.

FIG. 5 is a block diagram of the control apparatus which allows the steam heating apparatus to operate automatically.

FIG. 6 is a schematic diagram of the control apparatus illustrating the modes and sequence of operation of the steam heating apparatus.

DESCRIPTION OF THE PREFERRED EMBODIMENT

Figure 3:
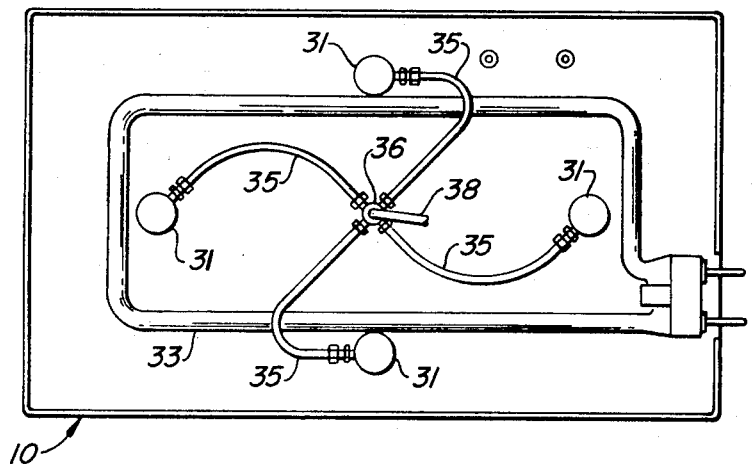
FIG. 3 is a bottom elevational view of the lower plate showing the atomizing nozzles and the electrical heating element for the lower plate.

Referring now to the drawing and initially to FIGS. 1 to 4, a preferred form of apparatus according to this invention includes a steam housing 10 having a cover 12 hingedly connected thereto and a rear housing 15. Rear housing 15 includes a top portion defining a water compartment generally indicated at 16 in which the water supply for the apparatus is stored. The bottom portion 18 of the rear housing preferably contains the control apparatus for the steam heater which will be described below.

Figure 4:
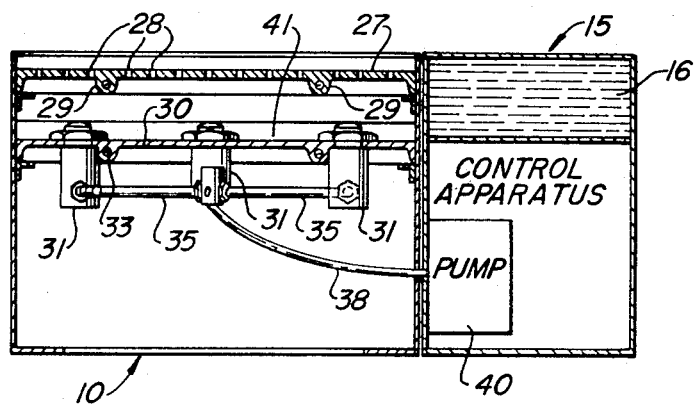
FIG. 4 is a vertical sectional view along the line 4—4 of FIG. 2.

The cover 12 is provided with a handle 20 and, beneath its top portion 21, with an electrical resistance "sear" heater 23 connected to the cover as by brackets 24. Steam housing 10 is provided with a plate 27 having apertures 28 therein. Plate 27 defines with cover 12 a heating compartment for food and also provides a support for food to be heated. Plate 27 is provided on its bottom surface with a cast-in electrical heating element 29 as best seen in FIG. 4.

A short distance below plate 27 a second plate 30 is provided and supports a plurality of atomizing nozzles 31, four being shown. An electrical heating element 33 which may be of the same type as the heating element 29 beneath plate 27 is cast in the bottom surface of the second plate 30. Atomizing nozzles 31 are interconnected by suitable tubing 35 and have a common connection 36 (FIG. 3) to a conduit 38 which is connected through the wall of steam housing 10 to a motor driven pump 40 in rear housing 15. Apertured plate 27 and lower plate 30 define therebetween a steam producing chamber 41.

The front panel 43 of steam housing 10 is provided with one or more switches, three being shown, by which steam heating cycles of different duration or a sear heating cycle may be initiated. A ready light 45 is also provided on the front panel to indicate that heaters 29 and 33 have reached a desired temperature and a cycle light 44 is also provided which, when extinguished, indicates that the selected cycle has been completed and the food is ready to be served. In the illustrated embodiment switches 47 and 48 are operated to select steam cycles of different duration, a shorter duration for sandwiches and the like selected by switch 47 and a longer duration for frozen dinners and the like selected by switch 48. Switch 50 is operated to initiate a sear cycle in which heating element 23 is energized to cause browning of meat, rolls or the like positioned on apertured plate 27. Switches 47, 48 and 50 are suitably connected to control apparatus described below.

In operation, upon depressing one of the buttons 47, 48 the heating elements 29, 33 are energized (if not already energized as described below) and heat the plates 27 and 30 to a desired temperature. After the plates 27 and 30 reach the predetermined temperature the control apparatus allows the pump 40 to operate for a part of the selected time interval and supply water through tubes 38 and 35 to the atomizing nozzles 31. Nozzles 31 atomize the water and project droplets upwardly against plate 27 where the droplets are instantly vaporized into steam. Any droplets that are not fully converted into steam fall back onto heated plate 30 and are vaporized thereby into steam. Thus, while it is not essential that plate 30 be heated, heating does assist in converting more of the water into steam. The steam thus generated passes upwardly through the apertures 28 in upper plate 27 into the heating compartment to heat the food therein. Pump 40 is operated during only a portion of the heating period so that not too much steam is generated and the food being heated does not become soggy. At the end of the proper time period operation ceases automatically and the cycle light 44 is extinguished indicating that the food in the food compartment is ready to be served.

If it is desired to brown meat or bread in the food compartment, this is usually best done after the steam heating operation and is initiated by depressing switch 50. The sear heater 23 is thereupon energized for a predetermined time period to brown the meat or bread and at the end of the time period cycle light 44 goes off.

A preferred form of control apparatus which automatically controls the operation of the steam heating apparatus is shown in FIGS. 5 and 6. Referring first to FIG. 5, a voltage supply 60 is connected to supply current in line 62 representing a short steam heating cycle of operation for sandwiches and the like and in line 63 representing a long steam heating cycle of operation, such as for heating frozen dinners and the like. Voltage supply 60 is also connected to line 65 to energize the sear heater and to line 66 to energize the plate heaters. Initiation of either the short or long cycle of operation through lines 62 and 63, respectively, also causes energization of the plate heaters and both short and long cycles of operation involve the energization of a motor 70 which drives pump 40.

The apparatus for controlling a short cycle of operation includes a short timer switch 47' corresponding to switch 47 on the front panel 43 of steam housing 10. Short timer switch 47' is connected to and operates a relay 73 which allows heaters 29 and 33 represented by block 75 to be energized. The temperature produced by heaters 75 is monitored by a thermostat and when the temperature reaches a predetermined value a temperature switch 77 is operated and allows a short timer 80 to be energized and begin its timing period. When short timer 80 is energized it allows a short time delay relay 81 to be energized and start its timing period. Short time delay relay 81 is of the delayed operate type and allows motor 70 to be energized and to drive pump 40 during a predetermined interval before it operates.

The time period for short timer 80 is selected to be longer than the delay time of short time delay relay 81 so that when time delay relay 81 operates motor 70 is deenergized but short timer 80 has not yet timed out. Short timer 80 controls the release of the short timer switch 47' as indicated by the dashed lines therebetween and when short timer 80 times out short timer switch 47' is released and releases relay 73 to cause deenergization of heaters 75. Short time delay relay 81 is also deenergized when switch 47' is released. A short steam heating cycle of operation is thus completed.

Operation can be accomplished much more quickly, as during peak demand periods, by operating bypass switch 85 which bypasses relay 73 and allows heater 75 to be energized continuously. Since heaters 75 are constantly at a predetermined temperature, temperature switch 77 is closed and a short cycle of steam heating operation is initiated merely by operating short timer switch 47'. Thus, in this mode it is not necessary to wait for heaters 75 to reach their predetermined operating temperature.

Short timer 80 and short timer switch 47' are sold as a single unit by Lux Time Division of Robertshaw Controls Co. as Model 606-000, Catalog No. C-6837. Short time delay relay 81 is preferably Model 319 Time Delay Relay made by Automatic Timing and Controls, Incorporated. The temperature sensing unit for heater 75 including temperature switch 77 is sold by George A. Ulanet Co., 415 Market Street, Newark, New Jersey as Model No. HK207. Pump 40 and motor 70 are preferably a unit identified as Model EX-191-190-10 made by Gorman-Rupp Co. or may be a Series 200 pump and motor unit made by the March Pump Company.

A long steam heating cycle of operation is initiated and occurs in the same manner as the short cycle of operation by operating long timer switch 48' which corresponds to switch 48 on the front panel of steam housing 10. Heaters 75 are energized in the same manner and cause operation of temperature switch 77 which is used in both the short cycle and long cycle of operation. Operation of temperature switch 77 allows energization of a long timer 87 and a long time delay relay 88 resulting in operation of pump 40 in the same manner that operation occurs in the short cycle. The long cycle of steam heating operation is, obviously, longer than the short steam heating cycle. In the short cycle, short timer 80 can be set for about 1 minute operation and short time delay relay 81 is then set for a delay of 12 to 15 seconds during which pump 40 operates. These time periods have been found desirable for heating refrigerated but unfrozen sandwiches and the like. In the long cycle of operation, long timer 87 is preferably set to operate for about 4 to 7 minutes and long timer 88 is then set for a delay of about 2 minutes during which pump 40 operates. These periods have been found suitable for heating frozen precooked dinners and the like.

In either a long or short cycle of operation, temperature switch 77 can be set to close at about 400° F.

Long timer switch 48 and long timer 87 are preferably a unit of the same type as short timer switch 47' and short timer 80. Likewise, long time delay relay 88 is preferably of the same type as short time delay relay 81.

In the sear mode of operation, sear timer switch 50' corresponding to switch 50 on front panel 43 of steam housing 10 is depressed to cause operation of relay 73 and energization of sear heater 23' corresponding to resistance heating element 23 in FIG. 1. Operation of relay 73 also causes energization of heater 75 and when the heaters have reached their predetermined temperature, temperature switch 77 operates and energizes the sear timer 92. When the sear timer has timed out sear timer switch 50' opens causing both heater 75 and sear heater 23' to be deenergized.

Thus, by employing the temperature switch 77 which monitors the temperature of heaters 75, a period is allowed for sear heater 23' to warm up before the sear timer 92 starts its timing cycle. A more accurate timing of the period during which the sear heater is actually heating and browning meat or bread in the heating compartment is established. Sear timer 92 and sear timer switch 50' are sold as one unit and may be of the same type as the unit consisting of short timer 80 and short timer switch 47' and the unit consisting of long timer 87 and long timer switch 48'.

Referring now to FIG. 6, the control apparatus is shown schematically. The control apparatus is supplied with electrical power from a source (not shown) and is generally connected between voltage supply lines 93 and 94. Short timer 80 is associated with the contacts of switch 47 and controls the release thereof. The contacts are actuated and held by depressing switch 47 on front panel 43. Switch 48 and long timer 87 are similarly associated and operate in the same way as also do switch 50 and sear timer 92. Switch 47 has normally open contacts 47a connected in series with short timer 80, normally open contacts 47b connected in circuit with short time delay relay 81, normally open contacts 47c in series with motor 70 and normally open contacts 47d in series with relay 73 and cycle light 44. Switch 48 similarly includes normally open contacts 48a connected in series with long timer 87, normally open contacts 48b connected in series with long time delay relay 88, normally open contacts 48c in series with pump motor 70 and normally open contacts 48d connected in circuit with relay 73 and cycle light 44.

Short time delay relay 81 has normally closed contacts 81a connected in series with motor 70 and contacts 47c. Long time delay relay 88 is provided with normally closed contacts 88a connected in series with motor 70 and contacts 48c.

Sear timer switch 50 has normally open contacts 50a connected in series with sear timer 92 and normally open contacts 50b connected in series with contact 73a of relay 73 and with sear heater 23 through one set of contacts of a thermostat 95. Sear timer switch 50 also has normally open contacts 50c connected in series with relay 73 and cycle light 44.

Ready light 45 is connected in series with contact 73a of relay 73 and with temperature switch 77. Heaters 75, indicated in dashed outline and including heaters 29 and 33, are likewise connected in circuit with switch contacts of thermostat 95 and with the parallel combination of contacts 73a of relay 73 and bypass switch 85. Thermostat 95 controls the supply of power to heaters 29 and 33 and sear heater 23 to maintain the heaters at substantially the desired temperature.

As noted above, the control apparatus provides two modes of operation, one in which the heaters 75 are initially not energized and in which time is allowed for the heaters to reach a predetermined temperature before steam heating of food is begun. Another mode of operation involves the use by bypass switch 85 so that the heaters 75 are continuously energized and maintained at a predetermined temperature. This mode of operation is useful for peak demand periods when the apparatus is in use continuously.

In the first mode, operation is initiated for a short cycle by depressing push button 47 on front panel 43 which causes contacts 47a, 47b, 47c and 47d to be closed and held closed. Relay 73 is energized by closing of contacts 47d so that contacts 73a are closed to allow power to be supplied to heaters 75. Cycle light 44 is also energized through contacts 47d to indicate that a cycle of operation is in progress.

After heaters 75 have reached a predetermined temperature, temperature switch 77 closes its contacts and energizes ready light 45 to indicate that the heaters 75 have reached the desired temperature. Short timer 80 is also energized through contacts 47a and begins its timing cycle at the end of which it will open the normally open contacts of switch 47. Short time delay relay 81 is also energized through contacts 47b and begins its timing cycle. Since time delay relay 81 is a delayed operate relay, contacts 81a remain closed during the timing cycle of the relay. Pump motor 70 is energized through contacts 81a and 47c and water is pumped to atomizing nozzles 31 so that steam is generated as described above.

As mentioned above, the time period of short timer 80 is set to be longer than that of short time delay relay 81 so that the time delay relay 81 will complete its time cycle first. At the completion of its time cycle, short time delay relay 81 opens it contacts 81a to deenergize pump motor 70 so that steam will no longer be generated in the unit. When short timer 80 has completed its cycle, contacts 47a, 47b, 47c and 47d will open and relay 73 will be deenergized and cause contacts 73a to open. Short time delay relay 81 will be deenergized and return normally closed contacts 81a to their closed position. Cycle light 44 and ready light 45 will be extinguished indicating that the food has been heated and is ready to be served and heater 75 will be deenergized to await the next initiated cycle of operation.

In the second mode of operation mentioned above, bypass switch 85 is maintained closed so that heaters 75 remain energized. After heaters 75 have reached a predetermined temperature the contacts of temperature switch 77 close and ready light 45 is energized to indicate that the unit is ready for operation. After placing the food in the steam heating compartment, steam generation is initiated by depressing push-button 47 (for a short cycle of operation) which closes contacts 47a, 47b, 47c and 47d and starts the timing cycles of short timer 80 and short time delay relay 81. Motor 70 is also energized and causes water to be supplied to atomizing nozzles 31. Operation proceeds as in the first mode of operation with contacts 81a opening at the end of the delay time of short time delay relay 81 and contacts 47a, 47b, 47c and 47d opening and contacts 81a closing at the end of the time cycle of short timer 80. Cycle light 44 is deenergized to indicate that the heated food is ready to be served. Ready light 45, however, remains on so long as bypass switch 85 is closed and heaters 75 remain at a sufficient temperature to cause the contacts of temperature switch 77 to be closed.

Operation of the apparatus using long timer 87 and long time delay relay 88 for the normal and "bypass" modes of operation is completely analogous to the operation for the short timer and time delay relay described above. Operation is initiated by depressing push-button 48 on front panel 43 and operation proceeds in a manner completely analogous to that described above, with of course, the contacts associated with long timer 87 and long time delay relay 88 being controlled rather than those of the short timer 80 and short time delay relay 81.

In the sear mode of operation, assuming that bypass switch 85 is open, depressing switch 50 on front panel 43 closes contacts 50a, 50b and 50c and energizes relay 73 which closes its contacts 73a and allows heater 75 and sear heater 23 to be energized. When heater 75 has reached a predetermined temperature sufficient to cause the contacts of temperature switch 77 to close sear timer 92 is energized and begins its timing cycle. At the end of the timing cycle of sear timer 92 contacts 50a, 50b and 50c are opened and heater 75 and sear heater 23 are deenergized and cycle light 44 and ready light 45 go off indicating that the sear cycle is complete.

If bypass switch 85 is closed so that heaters 75 are energized and have reached a temperature sufficient to cause the contacts of temperature switch 77 to be closed, then depressing of switch 50 closes contacts 50a, 50b and 50c to energize sear heater 23 and start the timing cycle of sear timer 92. At the end of the time cycle of sear timer 92 contacts 50a, 50b and 50c are opened to deenergize sear heater 23. Thus, sear operation when bypass switch 85 is closed gives a shorter effective sear period in that the time required for sear heater 23 to heat up is included in the cycle time of sear timer 92.

While a preferred embodiment of this invention has been specifically described and illustrated herein, it will be apparent to those skilled in the art who come to understand its essential principles and accomplishments that improvements and modifications may be made in the form specifically disclosed without departing from the spirit and scope of the invention. Accordingly, this invention is not to be limited to the form and embodiment specifically disclosed herein nor in any other way inconsistent with the progress in the art promoted by the invention.

What is claimed is:

1. Apparatus for controlled steam heating of food comprising a steam housing, an apertured metallic heat conductive plate in said housing, electrical heating means for heating said apertured plate, a cover for said housing defining with said apertured plate a heating compartment for food, a second metallic heat conductive plate in said housing below said apertured plate and defining therewith a steam producing compartment, electrical heating means for heating said second plate, a plurality of atomizing nozzles of heat conductive material supported by said second plate in heat transfer relation therewith, a pump for supplying water to said atomizing nozzles at pressures sufficient to cause the water to be atomized by said nozzles, a supply of water to be pumped, switch means for energizing both of said plate heating means, and electrical timing means responsive to predetermined temperatures of said heating means for causing said pump to supply water to said atomizing nozzles during a predetermined time period.

2. Apparatus as claimed in claim 1 including means defining a water compartment attached to said housing for containing the supply of water to be pumped.

3. Apparatus as claimed in claim 1 wherein said timing means includes a timer associated with said switch means and arranged to open said switch means at the end of its timing period to thereby deenergize said heating means, and a delayed operate relay energized with said timer and adapted to energize said pump during its delay period, the timing period of said timer being longer than the delay time of said delayed operate relay.

4. Apparatus as claimed in claim 3 wherein the timing periods of said timer and said delayed operate relay are initiated through said switch means and further including thermostatic switch means responsive to a predetermined temperature of said heating means for initiating the timing periods of said timer and relay through said switch means.

5. Apparatus as claimed in claim 1 including a bypass switch connected in circuit with said switch means to maintain said heating means continuously energized.

6. Apparatus as claimed in claim 1 including second switch means for energizing said heating means and second timing means associated with said second switch means and responsive to a predetermined temperature of said heating means for causing said pump to supply water to said atomizing nozzles for a predetermined time period, the predetermined time period of said second timing means being different from that of said first timing means.

7. Apparatus as claimed in claim 1 including a sear heater in said heating compartment, sear switch means for energizing said sear heater, and sear timing means associated with said sear switch means for controlling the time during which said sear heater is energized.

8. Apparatus for controlled steam heating of food comprising a steam housing, an apertured metallic heat conductive plate in said housing, electrical heating means for heating said apertured plate, a cover for said housing defining with said apertured plate a heating compartment for food, a second metallic heat conductive plate in said housing below said apertured plate and defining therewith a steam producing compartment, electrical heating means for heating said second plate, a plurality of atomizing nozzles supported by said second plate in heat transfer relation therewith, means defining a compartment for water integral with said steam housing, a pump having an inlet connected to said water compartment and an outlet connected to said atomizing nozzles, switch means for energizing said heating means, thermostatic switch means actuated in response to a predetermined temperature of said heating means, and electrical timing means responsive to operation of said switch means and said thermostatic switch means for causing said pump to supply water to said atomizing nozzles during a predetermined time period.

* * * * *